Figure 1:
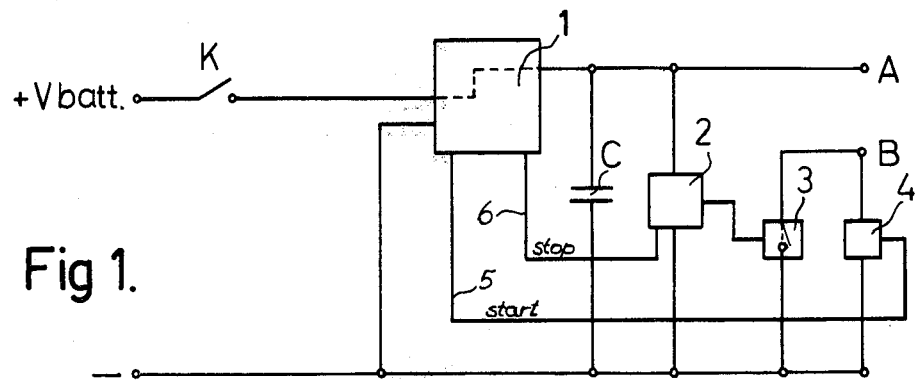

United States Patent [19]

Madsen

[11] 4,200,809
[45] Apr. 29, 1980

[54] APPARATUS FOR GENERATING ELECTRIC SHOCK PULSES

[75] Inventor: Birger B. Madsen, Rungsted Kyst, Denmark

[73] Assignee: Reofon A/S, Gentofte, Denmark

[21] Appl. No.: 919,603

[22] Filed: Jun. 27, 1978

[30] Foreign Application Priority Data

Jun. 29, 1977 [DK] Denmark .............................. 2917/77

[51] Int. Cl.² .............................................. H05C 1/06
[52] U.S. Cl. ................................. 307/132 R; 256/10; 231/2 E
[58] Field of Search ............... 231/2 E; 307/106, 108, 307/132 R, 132 V, 132 E, 132 M, 132 EA, 96; 256/10; 340/573; 331/112, 182; 361/256, 257; 219/113; 320/1; 315/206, 209

[56] References Cited

U S. PATENT DOCUMENTS

| 3,655,995 | 4/1972 | Malme | 256/10 X |
| 3,917,268 | 11/1975 | Tingey et al. | 331/112 X |

FOREIGN PATENT DOCUMENTS

| 253602 | 7/1963 | Australia | 256/10 |
| 782568 | 10/1957 | United Kingdom | 307/132 R |
| 1210372 | 10/1967 | United Kingdom | 307/132 R |

Primary Examiner—L. T. Hix
Assistant Examiner—James L. Dwyer
Attorney, Agent, or Firm—Burns, Doane, Swecker & Mathis

[57] ABSTRACT

An apparatus for generating electric pulses is disclosed. The apparatus comprises a generator or oscillator for charging a storage capacitor and a control circuit for controlling the discharge of the capacitor through an output or discharge circuit which includes a controllable switch device and two output terminals or electrodes. In an embodiment, the output circuit also includes a high voltage output pulse transformer.

Whenever a load resistance exists or occurs between the two output electrodes, a particular detector current will flow through the load resistance and through a specific detector or load sensing circuit in the apparatus. This detector current indicating that an external load resistance is present, will automatically start the charging generator which then will operate to charge and recharge the storage capacitor as long as the detector current exists, i.e. as long as the external load is present.

7 Claims, 4 Drawing Figures

APPARATUS FOR GENERATING ELECTRIC SHOCK PULSES

The present invention relates to an apparatus for generating electric shock pulses and comprising a power source, a generator for charging a capacitor, and a control circuit for controlling the discharge at a predetermined voltage level of said capacitor through a discharge circuit including a controllable switch device and two output terminals.

E.g. in slaughterhouses, such apparatuses, designed as a hand tool, are already in use when the animals are driven from the receiving folds and into the slaughtering rooms. The hand tool in question has the shape and size similar to an electric torch and the two output terminals are arranged as two freely projecting electrodes at the outermost end of the tool.

In the interior of the apparatus, there is a battery powered generator and when the two electrodes are pressed against the body of an animal, the animal is exposed to an electric shock. In order that the apparatus does not consume battery power of importance in the pauses between each use, a switch is provided which may be finger operated. Most often, the switch is, however, associated with the electrodes and if so these are yielding to give the possibility of electrode travels against spring forces, whereby a switch may be closed automatically, when the electrodes are pressed against an animal.

This switch which is, in fact indispensable, causes a number of drawbacks, whether finger operated or electrode operated. A finger operated switch is inconvenient to use and may fatigue the user's fingers and if, for that reason, the user omits to open the switch between each use, an unnecessary consumption of battery power will be the result. Furthermore, the switch is subjected to wear, not least because of the rather dirty surroundings which also necessitate that a finger operated switch must be arranged in a water- and dust-proof manner which is a problem in itself.

In prior art apparatuses having an electrode operated switch, the electrodes are made so that they may slide telescopically in a guide against spring forces. Here, the dirty field of employment quickly leads to functional problems due to intrusion of dirt and since the apparatus, in addition, is handled rather roughly and, most probably, is dropped on the floor a number of times, the sliding electrodes would easily get stuck because of bent or dirty electrodes. The switch-operating electrodes are in other words very vulnerable mechanical elements.

It is an object of the present invention to provide an apparatus for generating electric shock pulses and by which the above drawbacks are eliminated. This is obtained by the peculiarities of the apparatus according to the invention as stated in the characterizing clause of claim 1.

The detecting or load sensing circuit in the apparatus according to the invention will automatically establish whether an external load exists between the output terminals or electrodes, and a power consumption of importance will only take place, when such an external load exists. Thus the power consumption may be minimized and when the apparatus according to the invention is used as or in a hand tool of the type mentioned above, mechanical switches and movable parts may, in addition, be completely avoided, and such a tool may easily be encapsulated effectively in a water- and dust-proof manner.

Figure 2:
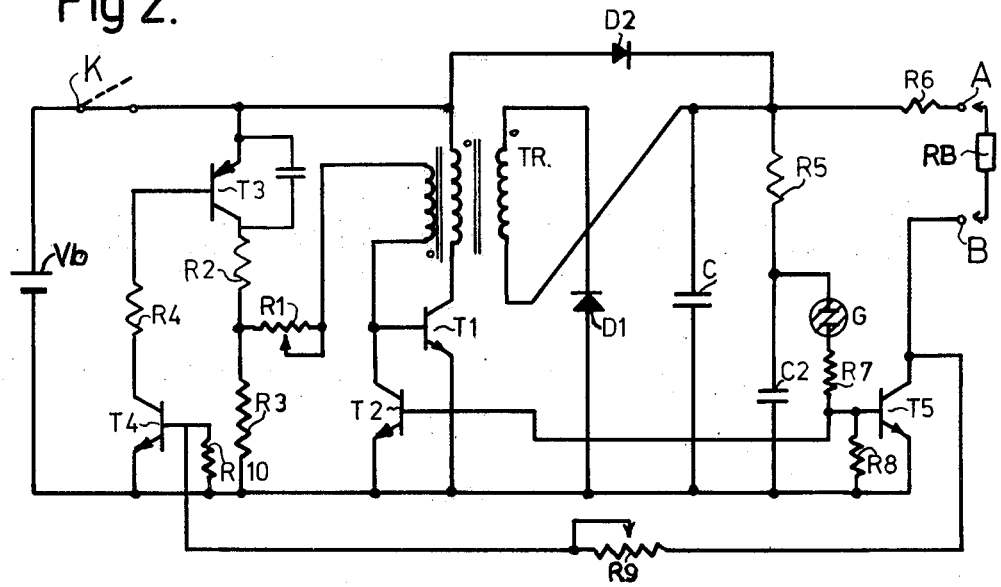
Figure 3:
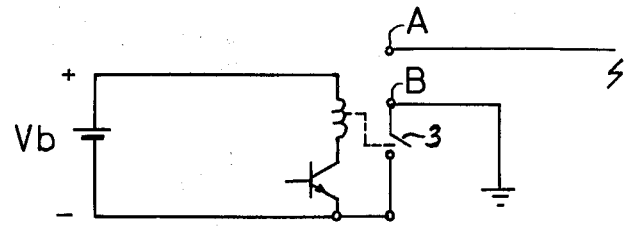
Figure 4:
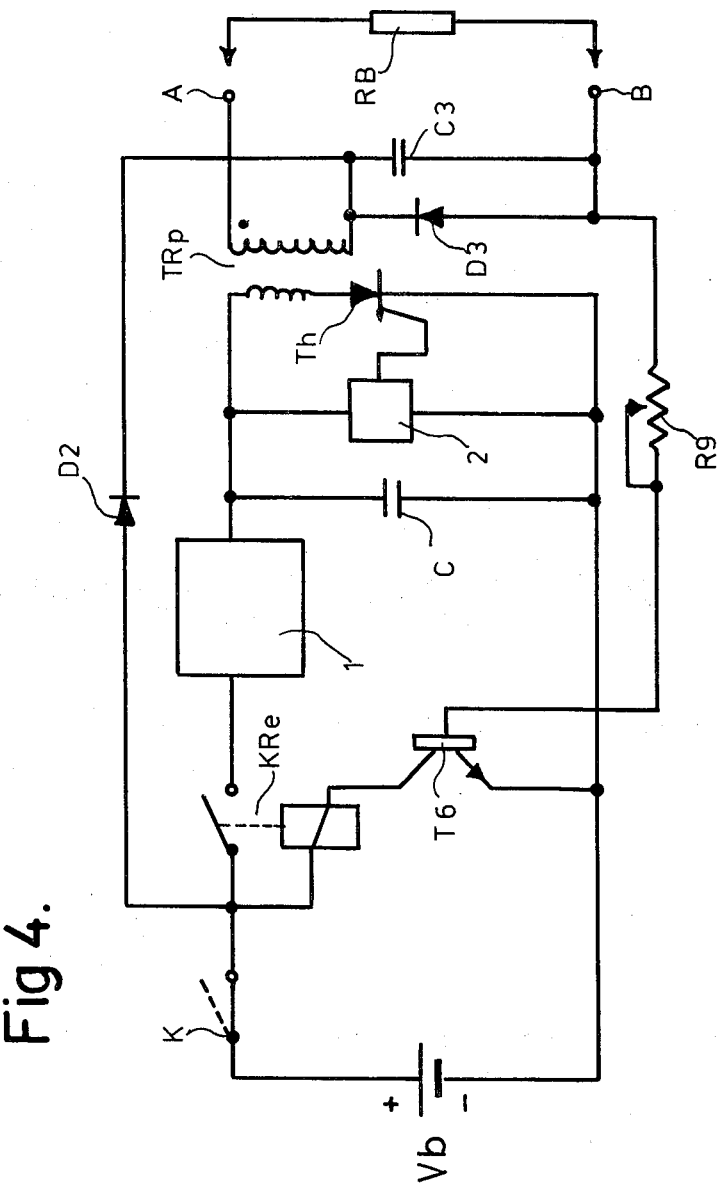

In the following, the present invention is explained in further detail, referring to the drawings in which FIG. 1 is a block diagram schematically illustrating the concepts of an apparatus according to the invention, FIG. 2 is a circuit diagram illustrating an embodyment of the apparatus according to the invention, FIG. 3 is a schematic illustration of an embodiment of the apparatus according to the invention arranged as a pulse generating device for an electric wire fence, and FIG. 4 is a schematic illustration of another embodiment of the apparatus according to the invention.

FIG. 1 shows the basic concepts of an apparatus according to the invention. The main components shown are a power source, a generator 1, a capacitor C, a control circuit 2, a controllable switch device 3, a detector or load sensing circuit 4, and two electrodes or output terminals A, B.

Referring to FIG. 1, the apparatus according to the invention operates in the main as follows:

When a manually operated main breaker K is closed, the apparatus is ready for use. If there is an external load across the electrodes A, B or as soon as such a load occurs, a current will flow from the power source, past or through the generator 1 (as shown in dotted lines) through the external load and through the detector circuit 4 back to the power source. Accordingly, this detected current will indicate that an external load is present between the electrodes A and B.

The detected current causes that the detector circuit 4 to apply a pulse or signal through a connection 5 to the generator 1, whereby the generator is actuated to charge the capacitor C. When the capacitor has been charged to a predetermined value, the control circuit 2 causes the capacitor to discharge through the switch device 3 and the external load between the electrodes A and B.

If the external load is still present after such a first capacitor discharge, the capacitor is recharged and a new current shock is applied through the load.

In the above description of the function, the generator 1 is only actuated when or after that an external load is present. If the main breaker K is closed at an earlier time, i.e. while a load is not yet present between electrodes A, B, nothing will happen in the apparatus. The apparatus of the invention may, however, also be constructed so that the generator 1 is started immediately when the main breaker K is closed, whether an external load is present or not. Thereby, the capacitor C will be charged and, thus, the capacitor stands in its charged condition until an external load occurs between the electrodes A and B, whereafter the discharge and recharging of the capacitor take place as explained above.

Apart from the above first or initial charging, if any, of the capacitor C, the generator 1 will only be started when there is a load between the electrodes which provides the detector current mentioned above. Thus a power consumption of importance will only take place when and while an external load is present.

Certain types of generators are, however, able to be self-supplying after an initial starting. If the apparatus according to the invention comprises a generator of that type, the generator will, accordingly, continue to operate also after that the external load has been removed, whereby the detector current stops flowing. In particular, but not exclusively, in such cases it is desirable that the apparatus according to the invention comprises specific means for stopping the generator, when or after that the capacitor C has been charged to a predetermined value. According to the invention, these means may appropriately be a part of or be combined with the control circuit 2 which already senses or controls the capacitor voltage. A stop signal connection is indicated at 6 in FIG. 1.

Referring now to FIG. 2, the generator of the embodiment illustrated is arranged as a ringing oscillator comprised by resistors R1, R2, and R3, a transformer TR, a transistor T1 and a diode D1.

In the generator, the transformer TR is charged with magnetic energy, while the transistor T1 is in its conducting condition. When the transistor T1 is blocked, the magnetic energy is converted into electric energy, which is stored in the capacitor C. The resistor R2 is only necessary to start the oscillator.

In FIG. 2, the control circuit (2 in FIG. 1) is comprised by resistors R5, R7 and R8, a capacitor C2 and a glow tube G.

The detector or load sensing circuit (4 in FIG. 1) comprises resistors R9 and R10, a transistor T4 and a resistor R4. The switch device 3 in FIG. 1 is a transistor T5 in FIG. 2.

If the main breaker K in the apparatus according to FIG. 2 is closed while there is no load resistance RB between the electrodes A and B, nothing will happen in the apparatus and thus there is no power consumption, either.

If on the other hand, a resistance RB is present when the breaker K is closed, or if such a resistance occurs while the breaker K is in its closed condition, a current will flow through the diode D2, a resistor R6 and the external load resistance RB. This current flows on through the resistor R9 and to the base of the transistor T4.

The transistor T4 will now become conductive and draws current through the resistor R4 and the base of a transistor T3 which is inserted in the input of the generator. Thereby, the transistor T3 will become conductive and the generator starts and will continue to operate as long as the external load RB is present between the electrodes A and B.

When the generator operates, the capacitor C will be charged and in the control circuit the capacitor C2 will be charged to the firing voltage of the glow tube G which is fired thereby and the capacitor C2 is discharged through resistors R7 and R8 and the base of transistor T5. Transistor T5 now becomes conductive and the capacitor C is now able to discharge through resistor R6 and the external load resistance RB.

When the load resistance RB is removed, the generator may in principal continue to operate, since it is self-supplying via its feed-back winding. In order to stop the generator, there is inserted a transistor T2 between the base and the emitter (negative) of the transistor T1.

When the load RB is removed, the control circuit will continue to apply pulses through the glow tube G and thereby to base of transistor T2. Thereby, the transistor T2 will come to saturation whereby the basis of transistor T1 falls down to a potential being so low that the generator stops.

The diode D2 is only necessary in order to start the generator in the case that the capacitor C has been completely discharged. Simultaneously, the diode D2 serves to block for high voltage on the output.

In an embodiment of the apparatus according to the invention, the generator may, as already mentioned, start at once when the breaker K is closed, regardless of whether there is an external load between the electrodes A and B or not. To that end, an optional capacitor may, e.g. as indicated in FIG. 2, be connected as a shunt across the transistor T3. This capacitor will be charged to the battery voltage and that charging pulse will be able to start the generator. If no load resistance is present between the electrodes A and B, the generator will stop in the same manner as explained above, since the shunt capacitor stands fully charged and the transistor T3 is blocked.

In the embodiment according to FIG. 2, the presence of a load resistance between the electrodes A and B will, accordingly, at any time provide a current through the detector or load sensing circuit. This detector current will via the detector circuit transistor T4 result in that the transistor T3 serving as a controlled switch device in the input of the generator, is rendered conductive and is maintained conductive when and as along as the detector current exists, i.e. as long as the external load RB is present.

The embodiment according to FIG. 2 is suitable for use as or in an electric shock generator designed as a battery powered hand tool (a so called electric driver), since the power consumption is minimized and since there is no need of a hand or electrode operated switch means, including vulnerable movable components. Moreover, the tool may be effectively encapsulated in a dust- and damp-proof housing.

However, the apparatus according to the invention will also be suitable for use as the pulse generating device for an electric wire fence as indicated schematically in FIG. 3.

In that case, one of the electrodes A and B is connected to ground, whereas the other electrode is connected with the fence wire. The generator in the apparatus according to the invention will be able to charge the capacitor up to a voltage of 5,000 volts volt and an output pulse transformer is not necessary. The switch device 3 should be a high voltage switch e.g. a Reed-relay.

FIG. 4 shows schematically a further embodiment of the apparatus according to the invention. Components or parts corresponding to similar components in FIG. 1 or 2 have been assigned the same reference designations.

In FIG. 4, the generator 1 and the control circuit 2 are only shown as respective blocks as in FIG. 1, but the generator and/or the control circuit may be arranged as shown and explained in connection with FIG. 2.

Although only illustrated in FIG. 4 as comprising an adjustable resistance R9 and a transistor T6, the detector or load sensing circuit (4 in FIG. 1) may also be arranged as illustrated and explained in connection with FIG. 2. However, the transistor T6 should, preferably, have a sufficiently high current gain. A so called Darlington transistor is suitable as transistor T6.

The essential difference relative to the FIG. 2 embodiment resides in the fact that in FIG. 4 a particular output circuit has been provided including a high voltage pulse transformer TRp. The output circuit further includes a capacitor C3 and a diode D3.

The diode D3 and the capacitor C3 in the output circuit of the apparatus shown are arranged to block off the direct current from the battery so that this current is conducted through the external load resistance RB, if or when such a load is present. The diode D3 and the capacitor C3 of the output circuit may, accordingly, be considered as being a part of the detector or load sensing circuit (4 in FIG. 1).

The diode D3 may be omitted, but in that case, the capacitor C3 should have to be inconveniently large in order to render the pulse voltage drop thereover neglectable.

In FIG. 4, the controllable or voltage-controlled switch device (3 in FIG. 1) is comprised by a thyristor Th. Moreover, the generator input or starting transistor T3 in the FIG. 2 embodiment has been replaced by an electromagnetic relay switch KRe. A proper on/off effect as that provided by the relay switch is desirable as far as the starting circuit for the generator 1 is concerned. However, if desired or appropriate, the starting pulse or signal for the generator may also be provided by a starting circuit including transistors.

Referring to FIG. 4, the embodiment shown operates as follows: When the resistance between the electrodes or output terminals A, B is large, e.g. when no external load RB is present, the direct current which is able to flow from the battery Vb, via the diode D1, through the secondary of the pulse transformer TRp, and through the load RB and resistor RB through the basis of transistor T6, will be weak or zero, and will not be sufficient to bring transistor T6 into saturation.

However, with decreasing resistance between electrodes A, B, the basis current to transistor T6 will increase, whereby the collector current will increase which, in turn, will cause the relay switch KRe to close at a certain time.

The generator 1 will now operate and charge the capacitor C to a predetermined value, whereafter the control device 2 will fire the thyristor Th. Thereby, the capacitor C will discharge through the primary of pulse transformer TRp, and a high voltage pulse will be generated in the secondary of the pulse transformer.

With the diode D3 and with properly polarized secondary in the pulse transformer TRp, the positive portion of the high voltage pulse will flow uncut through the load RB and back through the diode D3, whereas the negative pulse portion will be shunted via capacitor C3.

The generator 1 will continue to operate and the apparatus will generate repeated high voltage pulses over the load RB as long as the resistance thereof is sufficiently low.

The embodiment in FIG. 4 is suitable for use both as a pulse generator device for electric wire fences and as or in a hand held driver tool without vulnerable movable mechanical components, and which may be effectively encapsulated in a dust- and damp-proof housing.

The advantage of the apparatus according to the invention as regards low power consumption will be most outstanding in connexion with battery powered apparatuses. However, there is nothing to prevent that the apparatus according to the invention is provided with other types of power sources.

Obviously, further variations from the embodiments represented in the drawings and described above may be resorted to without departing from the spirit of this invention, and the scope thereof should be determined only as limited by a proper interpretation of the terms used in the following claims.

I claims:

1. An apparatus for generating electric shock pulses comprising a power source; a generator for charging a capacitor; and a control circuit for controlling the discharge at a predetermined voltage level of said capacitor through a discharge circuit including a controllable switch device and at least two output terminals, CHARACTERIZED by further comprising a detector circuit connected and arranged in such a manner that a detector current will flow from said power source and through an external load as soon as such a load occurs across said output terminals, said detector circuit comprising means which, responsive to said detector current, provide a starting signal for rendering said charging generator operative.

2. The apparatus as defined in claim 1 further CHARACTERIZED in that said starting signal providing means comprise a switch device which is rendered conductive by said detector current and which thereby applies a closing signal to a switch device associated with the input of said charging generator, whereby said input switch device is kept closed as long as said detector current exists.

3. The apparatus as defined in claim 2, further CHARACTERIZED by a capacitor connected in a shunt over said generator input switch device for further enabling said generator to initially charge said capacitor regardless of whether a load is connected to said output terminals.

4. The apparatus as defined in claim 2, further CHARACTERIZED in that said generator input switch device is an electro-magnetically operated relay switch.

5. The apparatus as defined in any of claims 1-4, further CHARACTERIZED in that said control circuit comprises means for stopping said charging generator, when said capacitor has been charged to a predetermined voltage level.

6. The apparatus as defined in any of claims 1-4, CHARACTERIZED in that said discharge circuit further comprises a high voltage output pulse transformer.

7. The apparatus as defined in claim 5, wherein said discharge circuit further comprises a high voltage output transformer.

* * * * *